United States Patent
Yee

(10) Patent No.: US 6,478,258 B1
(45) Date of Patent: Nov. 12, 2002

(54) SPACECRAFT MULTIPLE LOOP HEAT PIPE THERMAL SYSTEM FOR INTERNAL EQUIPMENT PANEL APPLICATIONS

(75) Inventor: Eddy M. Yee, Millbrae, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 79 days.

(21) Appl. No.: 09/718,181

(22) Filed: Nov. 21, 2000

(51) Int. Cl.[7] .................................................. B64G 1/58
(52) U.S. Cl. ......................................... 244/163; 165/41
(58) Field of Search ............................ 244/158 R, 163; 361/385; 165/106.14, 171, 104.12, 104.21, 104.23, 104.31, 904, 41, 104.14, 104.33

(56) References Cited

U.S. PATENT DOCUMENTS

| | | | | |
|---|---|---|---|---|
| 4,880,050 A | * | 11/1989 | Najamura et al. ............. | 165/41 |
| 5,332,030 A | * | 7/1994 | Spencer et al. ............... | 165/41 |
| 5,735,489 A | * | 4/1998 | Drolen et al. ................ | 244/163 |
| 5,954,298 A | * | 9/1999 | Basuthakur et al. ......... | 244/163 |
| 6,227,288 B1 | * | 5/2001 | Gluck et al. ............ | 165/104.26 |

OTHER PUBLICATIONS

US 2002/0007937 a1 kroliczek et al filed on Jun. 30, 2000.*

* cited by examiner

*Primary Examiner*—Galen L. Barefoot
(74) *Attorney, Agent, or Firm*—Kenneth W. Float

(57) ABSTRACT

A loop heat pipe cooling system for use on a spacecraft. The loop heat pipe cooling system has loop heat pipes routed from internally facing surfaces of one or more internally located equipment panels to externally located radiator panels. Heat is collected at evaporator ends of each loop heat pipe and transported to condenser ends of the respective loop heat pipe. The condenser ends of the loop heat pipes may either be embedded within the radiator panel or externally mounted and coupled to the radiator panel using a loop heat pipe condensing flange. Fixed conductance heat pipes may also be used in any or all of the internal panels and radiator panels in order to collect and distribute heat loads to and from the loop heat pipes.

6 Claims, 2 Drawing Sheets

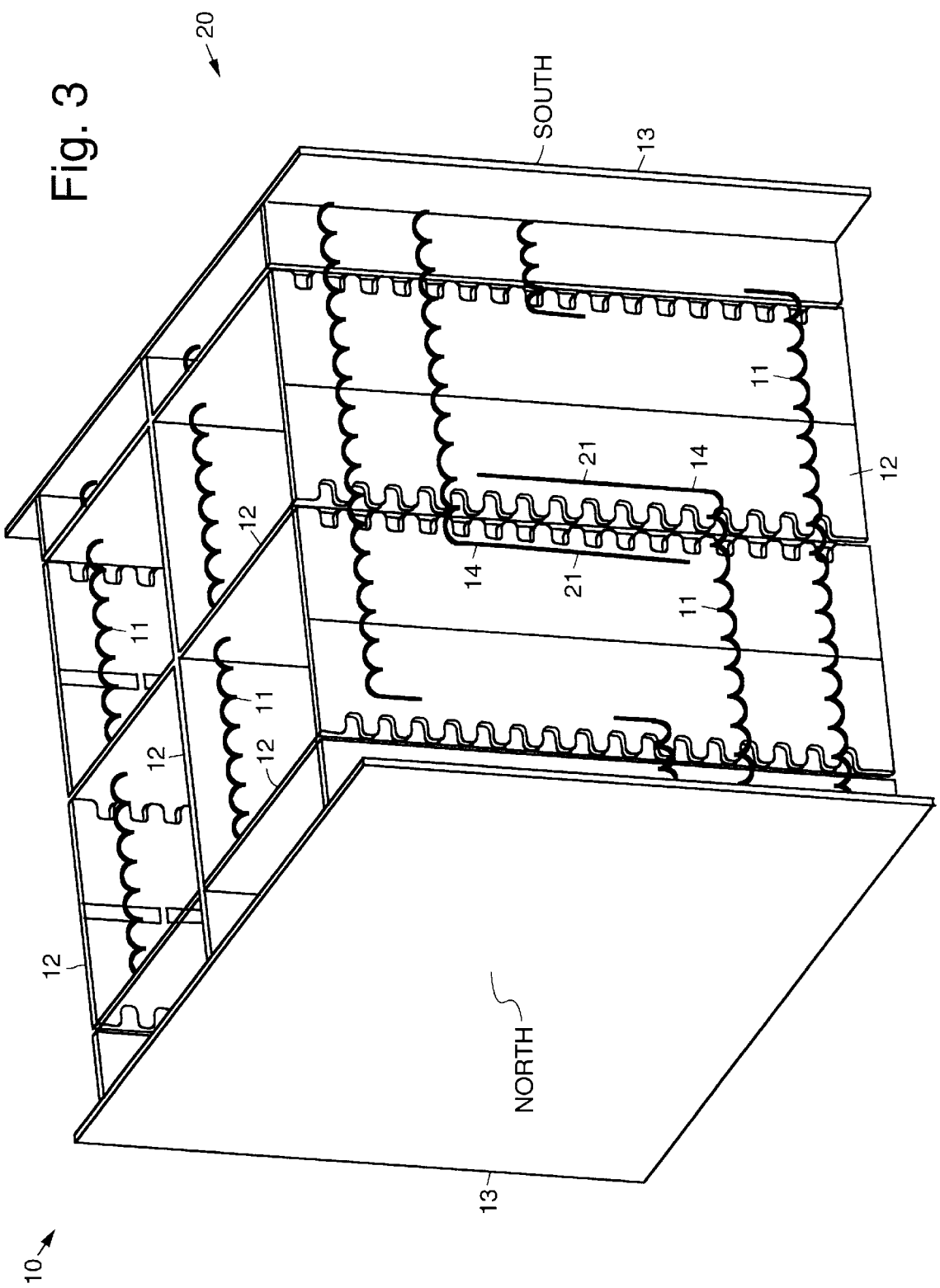

SPACECRAFT MULTIPLE LOOP HEAT PIPE THERMAL SYSTEM FOR INTERNAL EQUIPMENT PANEL APPLICATIONS

BACKGROUND

The present invention relates generally to spacecraft, and more particularly, to a cooling system employing loop heat pipes for use on a spacecraft.

The assignee of the present invention manufactures and deploys spacecraft containing communication equipment that orbit the earth. Heretofore, fixed conductance heat pipes have been used to transport heat from internal equipment panels housing the communication equipment to external radiator panels. Such fixed conductance heat pipes are disclosed in French Patent 2,463,058, for example. Aft deployable thermal radiators using loop heat pipes are disclosed in U.S. patent application Ser. No. 09/54396, filed Sep. 16, 1998, assigned to the assignee of the present invention. However, loop heat pipes have not heretofore been used to provide cooling between internal equipment panels and external radiator panels.

Accordingly, it would be advantageous to have an improved loop heat pipe cooling system for use on a spacecraft.

SUMMARY OF THE INVENTION

The present invention provides for a loop heat pipe cooling system that provides efficient thermal pathways between spacecraft equipment mounted on any number of internal equipment panels to a combination of multi-directional facing radiator panels. Loop heat pipes employed in the cooling system may be routed from the internal equipment panels to one or more radiator panels in order to optimize spacecraft heat sharing between radiator panels. This improves the overall efficiency of the radiator panels.

Loop heat pipes are similarly distributed and routed for each of the internally located equipment panels, although this is not an absolute requirement. Heat is collected at evaporator ends of each loop heat pipe and then transported to condenser ends of the loop heat pipes.

The condenser end of each loop heat pipe may either be embedded within the radiator panel as to provide a direct condensing loop heat pipe radiator panel or externally mounted to the radiator panel as a loop heat pipe condensing flange. Fixed conductance heat pipes may additionally be used in any or all of the internal panels and radiator panels in order to collect and distribute heat loads to and from the loop heat pipes.

The loop heat pipes used in the cooling system have a much higher heat transport capability than fixed conductance heat pipes. The loop heat pipes used in the cooling system are flexible and easily routed. The loop heat pipes used in the cooling system can be routed to multiple radiator panels in order to optimize heat sharing between radiator panels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a perspective view of the exemplary loop heat pipe cooling system.

DETAILED DESCRIPTION

Figure 1:
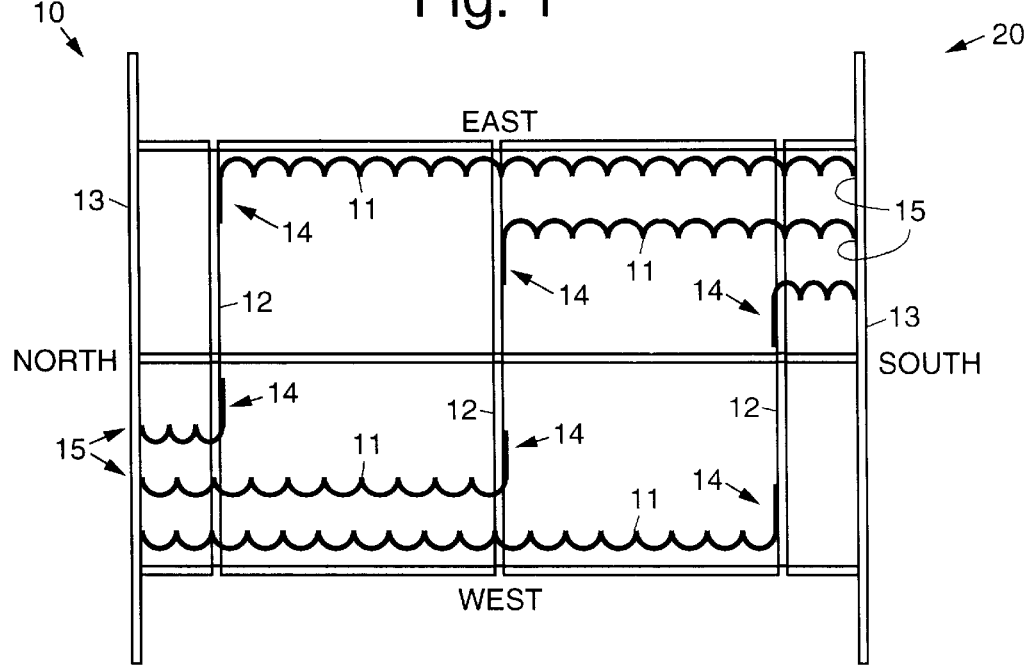
FIG. 1 is a top view of an exemplary loop heat pipe cooling system in accordance with the principles of the present invention for use on a space craft.
Figure 2:
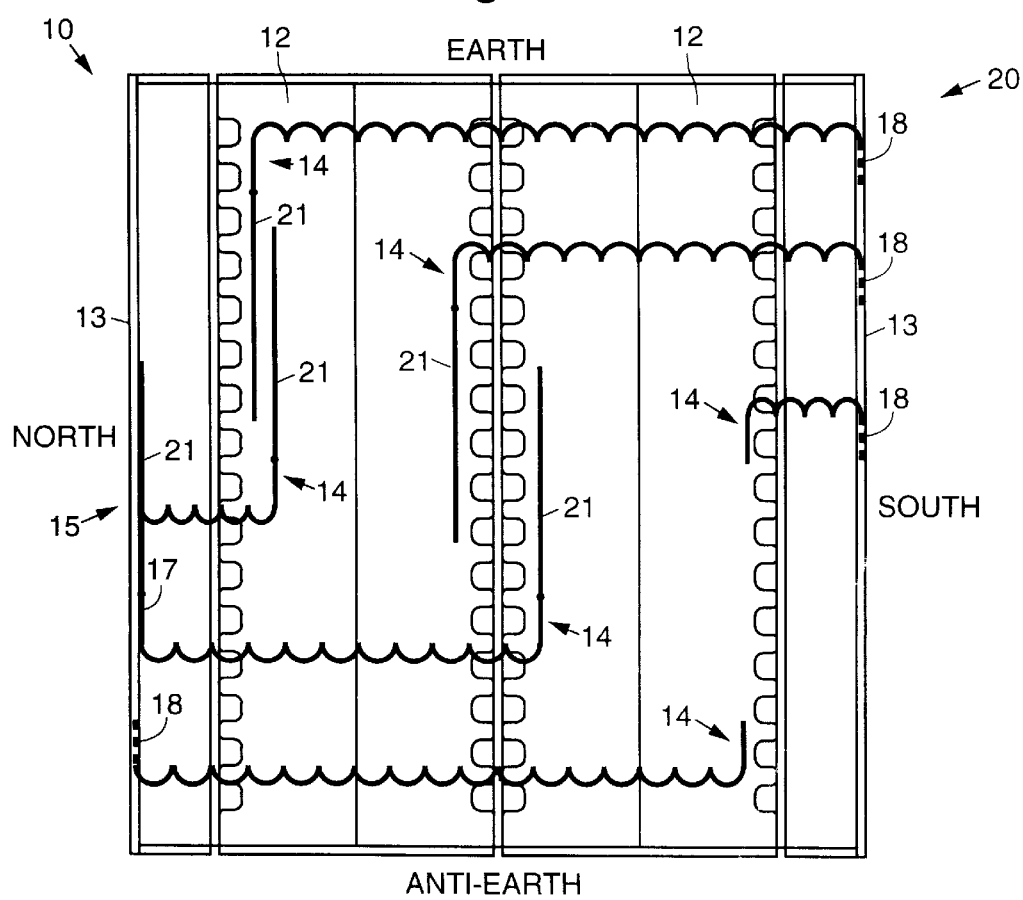
FIG. 2 is a cross sectional side view of the exemplary loop heat pipe cooling system.

Referring to the drawing figures, FIG. 1 is a top view of an exemplary loop heat pipe cooling system 10 in accordance with the principles of the present invention for use on a spacecraft 20. FIG. 2 is a cross sectional side view of the exemplary loop heat pipe cooling system 10 and FIG. 3 is a perspective view of the exemplary loop heat pipe cooling system 10.

The exemplary loop heat pipe cooling system 10 comprises multiple loop heat pipes 11 that are routed from internally facing surfaces of one or more internally located equipment panels 12 to externally located radiator panels 13. In the exemplary embodiment, the externally located radiator panels 13 are illustrated as north-facing and south-facing radiator panels 13. However, it is to be understood that the spacecraft 20 may have earth-facing, anti-earth facing, north-facing, south-facing, east-facing and west-facing radiator panels 13.

The total number of loop heat pipes 11 used in the cooling system 10 depends on the overall heat load. The loop heat pipes 11 are distributed to any number of opposite facing radiator panels 13. For example, one loop heat pipe 11 may be coupled to the north-facing radiator panel 13 and one loop heat pipe 11 may be coupled to the south-facing radiator panel 13. Alternatively, one loop heat pipe 11 may be coupled to north, south, east, west, earth and anti-earth facing radiator panels 13, or any combination thereof.

Loop heat pipes 11 are similarly distributed and routed for each of the internally located equipment panels 12, although this is not an absolute requirement. Heat is collected at an evaporator end 14 or evaporator flange 14 of each loop heat pipe 11 and then transported to a condenser end 15 of the respective loop heat pipe 11.

The condenser ends 15 of the loop heat pipes 11 may either be embedded within the radiator panels 13 (embedded condenser ends 18 shown in FIG. 2) to provide a direct condensing loop heat pipe radiator panel 11 or externally mounted and coupled to the radiator panels 13 by means of loop heat pipe condensing flanges 17. Fixed conductance heat pipes 21 (shown in FIG. 2) may also be used in any or all of the internal panels 12 and radiator panels 13 in order to collect and distribute heat loads to and from the loop heat pipes 11. A fixed conductance heat pipe 21 is attached to the condensing flange 17 and to selected evaporator ends 14 or flanges 14.

The loop heat pipes 11 used in the cooling system 10 have a much higher heat transport capability than conventional fixed conductance heat pipes. The loop heat pipes 11 are flexible and are easily routed. The loop heat pipes 11 used in the cooling system 10 can be routed to multiple radiator panels 13 in order to optimize heat sharing between radiator panels 13.

Thus, an improved cooling system employing loop heat pipes for use on a spacecraft has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A cooling system on a spacecraft, comprising:

a plurality of loop heat pipes routed from internally facing surfaces of one or more internally located equipment panels of the spacecraft to externally located radiator panels of the spacecraft; and one or more fixed conductance heat pipes mounted to selected internally facing surfaces of the one or more internally located equipment panels that are coupled to selected ones of the plurality of loop heat pipes.

2. The cooling system recited in claim 1 wherein selected ones of the plurality of loop heat pipes comprise embedded condenser ends.

3. The cooling system recited in claim 1 wherein selected ones of the plurality of loop heat pipes comprise condensing flanges.

4. The cooling system recited in claim 1 wherein the fixed conductance heat pipes are connected to evaporator ends of the loop heat pipes.

5. The cooling system recited in claim 3 wherein fixed conductance heat pipes are connected to selected condensing flanges.

6. The cooling system recited in claim 4 wherein the fixed conductance heat pipes are connected to selected condensing flanges.

* * * * *